3,660,491
METHOD FOR PREPARING UNSYMMETRICAL KETONES BY COBALT CATALYZED DECARBOXYLATION OF ACIDS
Hubert H. Thigpen and John C. Trebellas, Corpus Christi, Tex., assignors to Celanese Corporation, New York, N.Y.
No Drawing. Filed May 15, 1969, Ser. No. 825,080
Int. Cl. C07c 49/76, 49/80
U.S. Cl. 260—592      7 Claims

ABSTRACT OF THE DISCLOSURE

Preparation of an alkyl aryl ketone by reacting an aromatic acid with an aliphatic acid in the presence of a cobalt ion catalyst.

BACKGROUND OF THE INVENTION (1) Field of the invention

The present invention relates to a cobalt catalysis of the ketone-forming decarboxylation reaction between an aromatic acid and an aliphatic acid.

(2) Description of the prior art

Symmetrical and unsymmetrical ketones have been prepared by passing the vapors of carboxylic acids over thoria at high temperatures, e.g., 400° C.

Catalysis of these reactions has also been accomplished with barium salts and with magnesium salts.

SUMMARY OF THE INVENTION

We have found that an aliphatic carboxylic acid and an aromatic carboxylic acid can be reacted to form an unsymmetrical ketone by the use of a cobalt compound as catalyst. The products are useful as solvents.

In general, the reaction may be represented as follows:

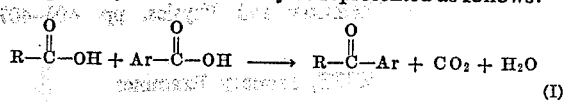

(I)

wherein R is an aliphatic radical, and typically is an alkyl group containing from 1 to about 30 carbon atoms, especially 1 to about 20. R can be either straight-chain or branched. Best results are obtained when the alpha carbon atom is free of substituents. Aralkyl acids can be employed. Ar is an aryl group, optionally substituted with one or more lower alkyl groups, and preferably free of substituents on the carbon atom occupying the position ortho to the carboxyl-substituted carbon atom. Ar can be alkyl-substituted or aryl-substituted, and it can be a condensed-ring radical such as naphthyl. Specifically suitable as the Ar radical are phenyl, alkyl-substituted phenyl groups, and halogenated phenyl groups.

DESCRIPTION OF THE PREFERRED EMBODIMENTS

A wide variety of reactants may be used for producing ketones according to the method of the present invention. Appropriate aliphatic carboxylic acids include, for example, lower alkanoic acids such as acetic acid, propionic acid, butyric acid, isobutyric acid, and caprylic acid; myristic acid, and stearic acid. Saturated acids are preferred, being less subject to adverse side reaction (polymerization) than unsaturated acids.

The aromatic acids which may be employed include such compounds as benzoic acid, meta- and para-toluic acid, xylic acid, meta-propyl benzoic acid, other alkyl substituted benzoic acids having up to about 20 carbon atoms, naphthoic acid, terephthalic acid, and isophthalic acid.

The reaction is preferably carried out in the liquid phase, although vapor-phase reaction is possible if the cobalt is on a solid support and if reaction temperature is kept high enough, and the pressure low enough, to vaporize the aromatic acid. The recommended molar ratio of aliphatic acid to aromatic acid ranges from approximately 1 up to about 40. In practice, it is preferable to maintain the molar ratio at about 20:1 or below, particularly from about 3:1 to 10:1.

The cobalt catalyst is advantageously employed as a solution. To minimize contamination by unwanted anions, cobalt hydroxide may be employed. Similarly, in reactions wherein acetic acid is the aliphatic acid employed in the reaction, cobalt acetate may be used. Alternatively, such water-ionizable compounds as the sulfate, chloride, or nitrate of cobalt may be used, as well as cobalt hydroxide, cobalt carbonate, and cobalt oxide (which forms the ionizable cobalt hydroxide in water).

The cobalt may be added in either cobaltic or cobaltous state, but under the reaction conditions it is converted to the cobaltous state.

The amount of cobalt employed as the catalyst may be varied within wide limits. We have found that the reaction is first order with respect to cobalt, so that an increase in the amount of cobalt catalyst employed, up to the limit of solubility in the reaciton system being employed, results in a proportional increase in the reaction rate. The limit of solubility in most systems is about 4 weight percent as cobalt, so the upper limit in most systems, as imposed by this solubility consideration, is about 4 weight percent as cobalt. The lower limit is about 0.3 weight percent, although lower concentrations can be employed if desired. The preferred range is from about 2 weight percent to about 4 weight percent, expressed as cobalt. Similarly, the temperature at which the reaction may be carried out is not critical, and we have found that satisfactory rates may be obtained at relatively low temperatures, as low as 90° C.

Pressure is not critical so long as it is high enough to maintain the reactants in the liquid phase at the reaction temperature being employed. Atmospheric pressure is usually sufficient, and subatmospheric pressures can even be employed in many instances.

In general, reactions of the present class may be carried out at temperatures between about 70° and 200° C., preferably between about 90° and 170° C., using a cobalt catalyst at a concentration between about 0.01 and 0.2 grams of cobalt ion per gram of aromatic acid reactant, and preferably between about 0.1 and 0.2.

The following examples will serve to illustrate further the process of the present invention.

EXAMPLE 1

A mixture containing 100 parts by weight acetic acid, 10 parts by weight para-toluic acid (approximate molar ratio of 20:1) and 2 parts water was permitted to react at atmospheric pressure in the presence of various amounts of cobalt acetate catalyst. The amount of para-methyl acetophenone produced after nine hours is given in Table I.

TABLE 1

[Acetic acid (100 parts); p-toluic acid (10 parts); water (2 parts) 9 hr.]

| Catalyst: cobalt acetate (parts by weight as cobalt) | Temp. (° C.) | Product: p-methylacetophenone (parts by weight) |
|---|---|---|
| 0 | 120 | 0.04 |
| 0.1 | 120 | 0.08 |
| 0.5 | 120 | 0.38 |
| 1.0 | 120 | 0.96 |
| 2.0 | 120 | 1.60 |
| 2.0 | 90 | 0.41 |

It will be noted that there is a substantially linear relationship between amount of cobalt catalyst and the amount of ketone product obtained, indicating a first order relationship.

EXAMPLE II

The reaction of Example I was carried out at 120° C. and atmospheric pressure using 2 parts by weight of cobalt, added as cobalt acetate, as catalyst.

Table II presents the results obtained with various amounts of water present in the reaction mixture and for varying reaction times.

TABLE II

[Acetic acid (100 parts); p-toluic acid (10 parts); cobalt acetate expressed as cobalt (2 parts); 120° C.]

| Time (hrs.) | Water (parts by weight) | Product: p-methylacetophenone (parts by weight) |
|---|---|---|
| 9 | 2 | 1.60 |
| 9 | 6 | 0.38 |
| 9 | 12 | 0.96 |
| 14 | 0 | 2.69 |
| 14 | 2 | 1.76 |
| 14 | 6 | 0.85 |
| 14 | 12 | 1.31 |

Variations may, of course, be made without departing from the spirit of this invention.

The embodiments of the invention in which an exclusive property or privilege is claimed are defined as follows:

1. A method for preparing an unsymmetrical ketone of the formula

wherein R is an alkyl radical having from 1 to about 30 carbon atoms and Ar is an aromatic radical selected from the group consisting of phenyl, alkyl-substituted phenyl, and halogenated phenyl radicals, comprising reacting an alkanoic acid of the formula

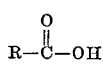

and an aromatic carboxylic acid of the formula

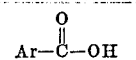

in the liquid phase at about 70° C. to 200° C. in the presence of a catalyst consisting essentially of a compound of cobalt that is ionizable in water and which is a member of the group consisting of cobalt acetate, cobalt sulfate, cobalt chloride, and cobalt nitrate.

2. The method of claim 1 wherein the alkanoic acid has up to about 20 carbon atoms and the aromatic carboxylic acid is selected from the group consisting of benzoic acid, xylic acid, naphthoic acid, terephthalic acid, isophthalic acid, meta-toluic acid, para-toluic acid, meta-propylbenzoic acid, and higher alkyl-substituted benzoic acids having up to about 20 carbon atoms.

3. The method of claim 2 wherein the aromatic carboxylic acid is selected from the group consisting of benzoic acid, meta-toluic acid, para-toluic acid, meta-propylbenzoic acid, and higher alkyl-substituted benzoic acids having up to about 20 carbon atoms.

4. The method of claim 3 wherein the reaction is effected at a temperature between about 70° C. and about 200° C.

5. The method of claim 4 wherein the reaction temperature is between about 90° C. and about 170° C.

6. The method of claim 5 wherein the alkanoic acid is a lower alkanoic acid and the aromatic carboxylic acid is an alkyl-substituted benzoic acid.

7. The method of claim 6 wherein alkanoic acid is acetic acid, the aromatic carboxylic acid is p-toluic acid, the cobalt compound is cobalt acetate, and the reaction product is p-methylacetophenone.

References Cited

UNITED STATES PATENTS

| 3,341,603 | 9/1967 | Leaman | 260—592 |
| 3,043,852 | 7/1962 | Mills | 260—595 |
| 3,329,723 | 7/1967 | Muench et al. | 260—591 |

FOREIGN PATENTS

| 374,543 | 4/1931 | Great Britain | 260—592 |
| 660,910 | 3/1964 | Italy | 260—592 |

OTHER REFERENCES

Handbook of Chemistry and Physics, pp. 406–407 (1940).

DANIEL D. HORWITZ, Primary Examiner

U.S. Cl. X.R.

252—472, 431, 440, 441, 438